United States Patent [19]
Wiseman et al.

[11] Patent Number: 5,380,066
[45] Date of Patent: Jan. 10, 1995

[54] BELT RETRACTOR WITH PUSH BUTTON CONTROLLED LOCKING BAR

[75] Inventors: Michael A. Wiseman, Indianapolis; Allan R. Lortz, Noblesville; David Merrick, Indianapolis, all of Ind.

[73] Assignee: Indiana Mills & Manufacturing, Inc., Westfield, Ind.

[21] Appl. No.: 14,111

[22] Filed: Feb. 5, 1993

Related U.S. Application Data

[63] Continuation-in-part of Ser. No. 897,872, Jun. 12, 1992, abandoned.

[51] Int. Cl.⁶ ............................................. A47C 31/00
[52] U.S. Cl. ................................. 297/476; 297/479; 297/467
[58] Field of Search ............... 297/476, 479, 467, 475, 297/474; 242/107.4 R

[56] References Cited

U.S. PATENT DOCUMENTS

| | | |
|---|---|---|
| 3,248,148 | 4/1966 | Board et al. . |
| 3,294,447 | 12/1966 | Riley . |
| 3,301,593 | 1/1967 | Lamb . |
| 3,323,832 | 6/1967 | Kirkpatrick . |
| 3,341,250 | 9/1967 | Rasmussen . |
| 3,750,102 | 7/1973 | Okada .................. 297/476 |
| 3,891,273 | 6/1975 | Takada . |
| 3,915,402 | 10/1975 | Takada, deceased . |
| 4,025,111 | 5/1977 | Tanaka et al. . |
| 4,181,326 | 1/1980 | Hollowell et al. ........... 242/107.4 A |
| 4,228,971 | 10/1980 | Arima et al. . |
| 4,245,798 | 1/1981 | Steger . |
| 4,295,684 | 10/1981 | Naitoh . |
| 4,305,618 | 12/1981 | Molnar . |
| 4,342,482 | 8/1982 | Takada . |
| 4,390,143 | 6/1983 | Takagi ........................ 242/107.4 R |
| 4,720,148 | 1/1988 | Anthony et al. . |
| 4,840,324 | 6/1989 | Higbee et al. . |
| 4,854,522 | 8/1989 | Brown et al. . |
| 4,907,757 | 3/1990 | Rumpf et al. . |

FOREIGN PATENT DOCUMENTS

| | | |
|---|---|---|
| 2426845 | 1/1976 | Germany . |
| 1311978 | 3/1973 | United Kingdom . |
| 2175194A | 11/1986 | United Kingdom . |

*Primary Examiner*—Clifford D. Crowder
*Assistant Examiner*—Bibhu Mohanty
*Attorney, Agent, or Firm*—Woodard, Emhardt, Naughton, Moriarty & McNett

[57] ABSTRACT

A retractor having means for controlling the withdrawal of a belt therefrom operated by a push button. A retractor frame has a spring biased rotatably mounted spool wrappingly receiving one end of a belt harness with the belt harness having an opposite end with buckle members fixed thereto to receive a buckle tongue. A locking bar is engageable with ratchet shaped end plates of the spool. The locking bar is pivotable into the ratchet shaped end plates to prevent further withdrawal of the belt harness. A manual push button control causes movement of the locking bar away from the ratchet shaped end plates to allow withdrawal of the belt harness until the push button is released and the locking bar pivots into its normal position in contact with the ratchet shaped end plates.

8 Claims, 8 Drawing Sheets

BELT RETRACTOR WITH PUSH BUTTON CONTROLLED LOCKING BAR

CROSS-REFERENCE TO RELATED APPLICATION

This application is a continuation-in-part of co-pending U.S. patent application Ser. No. 07/897,872, filed Jun. 12, 1992 and entitled BELT RETRACTOR WITH PUSH BUTTON CONTROLLED LOCKING BAR now abandoned.

BACKGROUND OF THE INVENTION

This invention is in the field of retractors typically used for seat belts.

DESCRIPTION OF THE PRIOR ART

Many patents have been granted that disclose automatic belt retracting devices, which include a spring biased spool to normally withdraw the belt into the retractor, but yieldable to allow the belt to be withdrawn therefrom and attached at the opposite end to a buckle or tongue. Typically, the prior art spools include a ratchet configured end plate that is lockingly engaged by a spring biased locking bar pivotally mounted to the retractor frame. Many of the prior art retractors have means for automatically holding the locking bar out of the locking position until a sufficient amount of belt has been withdrawn from the retractor. One such approach has been to provide a belt follower engaged with the bar that will hold the bar out of position until a sufficient amount of belt has unwrapped from the spool. Another approach is to provide a gearing mechanism or cam plate that holds the bar away from the locking position until the spool has rotated to a predetermined angle. The various mechanisms, including the cam plate, hold the locking bar out of the locking position until the retractor spool is slightly rewound. Once the locking bar is allowed to pivot into a locking position, the retractor is operable to prevent further withdrawal of the belt from the retractor. Thus, if the desired or necessary amount of belt is not withdrawn from the retractor prior to attaching the opposite end of the belt to a tongue or a buckle, and if the spool is allowed to slightly rewind, the retractor will automatically lock, preventing further belt withdrawal and possibly attachment of the belt to the tongue or buckle. In such a case, the belt must be completely rewound onto the retractor spool, resulting in considerable inconvenience to the user.

Disclosed in U.S. Pat. No. 4,720,148 is a mechanism for deactivating the cam plate and locking bar of a child seat retractor until the tongue attached to the opposite end of the belt is inserted into a buckle, whereupon the cam plate is released, allowing the locking bar to lockingly engage the retractor spool. It is also known to provide a locking bar which engages the ratchet spool only when the tongue and buckle are interengaged, such as shown in U.S. Pat. No. 3,915,402, or to provide a mechanism to contact and normally hold the locking bar in the removed position until the tongue is inserted into the buckle. Such a known mechanism includes a spring biased lever pivotally mounted to the retractor frame independent of the cam plate or ratchet spool and movable away from the locking bar which will then engage the ratchet wheel once the tongue and buckle are interengaged. Likewise, alternative design approaches have been suggested that include rotating the cam plate or to provide a non-automatic manual lever for independent operation of the cam plate.

It is also known to provide a child seat for mounting atop an automobile seat with the child seat having a harness for securing a child therein, such as shown in U.S. Pat. Nos. 4,025,111; 4,342,483; and 4,720,148. It is also known to provide on a child seat a retractor with the aforementioned mechanism for directly contacting and holding the locking bar for the controlled withdrawal of the child seat harness.

The retractor disclosed herein has a push button for controlling the locking bar. In one version, a rigid link extends between the push button and locking bar whereas in a second version, a cable extends between the push button and locking bar. A number of prior patents disclose retractors having cables for the operation thereof. In U.S. Pat. No. 3,294,447 issued to Riley, a cable has one end moved by a tongue inserted into a buckle whereas the opposite end of the cable is connected to a pawl to move the pawl into and out of engagement with the retractor spool ratchet. The pawl thereby remains locked with the ratchet wheel so long as the tongue is inserted into the buckle. A similar device is disclosed in the British patent specification 1311978 issued to Barnes. Despite the prior products, there is a need for a retractor having a push button or other operator allowing the user to lock and unlock at will the retractor web spool. Thus, the user may move the push button unlocking the web spool and then freely withdrawing the web from the retractor across the occupant in order to lock the opposite end of the web to a buckle or similar fashion. The user may then release the push button or similar operator allowing the retractor to automatically lock in position preventing the spool from further cinching down in case a rough ride is encountered. Likewise, even though the web is locked across the occupant, the push button may subsequently be moved to adjust the web relative to the occupant with the release of the push button automatically locking the web in place.

SUMMARY OF THE INVENTION

One embodiment of the present invention is a retractor for mounting to a child seat having a harness, an interengaged combination of a tongue and seat belt buckle comprising a frame; a spool to wrappingly receive a portion of the harness and having an axle and end walls at least one of which is configured as a ratchet wheel with the spool rotatably mounted to the frame; a spring mounted to the frame and normally urging the spool to rotate to a retracted position whereat a portion of the harness is wrapped thereon; a locking bar parallel to said axle and mounted to the frame to be movable between a removed position whereat the locking bar is located apart from the ratchet wheel and a normal locking position whereat the locking bar lockingly engages the ratchet wheel limiting movement of the spool; a cable mounted to the locking bar and movable from a first position whereat the locking bar is in the locking position to a second position whereat the cable moves the locking bar to the removed position; and an operator control means mounted to the end of the child seat opposite the locking bar and including a member that is manually operable to hold the cable in the second position when pushed, the cable being movable to the first position when the member is manually released.

Another embodiment of the present invention is a child seat harness for installation in an automobile comprising a child seat configured to receive a child; a harness mounted to the child seat and extendable over the child to secure the child within the child seat; an interlocking tongue and seat belt buckle mounted to the child seat and interlockable with the harness; an automatic retractor including a frame, spool to wrappingly receive a portion of the harness and having an axle and end walls at least one of which is configured as a ratchet wheel with the spool rotatably mounted to the frame, a first spring mounted to the frame and normally urging the spool to rotate to a retracted position whereat the harness is wrapped thereon, a locking bar mounted to the frame and movable between a removed position whereat the locking bar is unlocked from the ratchet wheel and a locking position whereat the locking bar lockingly engages the ratchet wheel limiting movement of the spool; and an operator including a manual push button mounted to the seat and movable from a first position whereat the locking bar is in the locking position, to a second position where the operator moves the locking bar to and holds the locking bar in the removed position until manually released, the operator including a cable extending between the locking bar and the manual push button to transfer motion of the manual push button to the locking bar, the spool free to rotate to extend or retract the harness at all times whenever the locking bar is moved to the removed position by the cable.

It is an object of the present invention to provide a new and improved means for manually deactivating a belt retractor's locking bar.

A further object of the present invention is to provide a new and improved child seat with harness incorporating a belt retractor with means for manually and selectively deactivating the locking bar of the retractor until the harness is secured.

A further object of the present invention is to provide a retractor for mounting to a child seat having a harness with tongue and buckle with the retractor having push button means for deactivating the locking bar of the retractor until the harness is satisfactorily adjusted.

Related objects and advantages of the present invention will be apparent from the following description.

DESCRIPTION OF THE PREFERRED EMBODIMENTS

Figure 3:
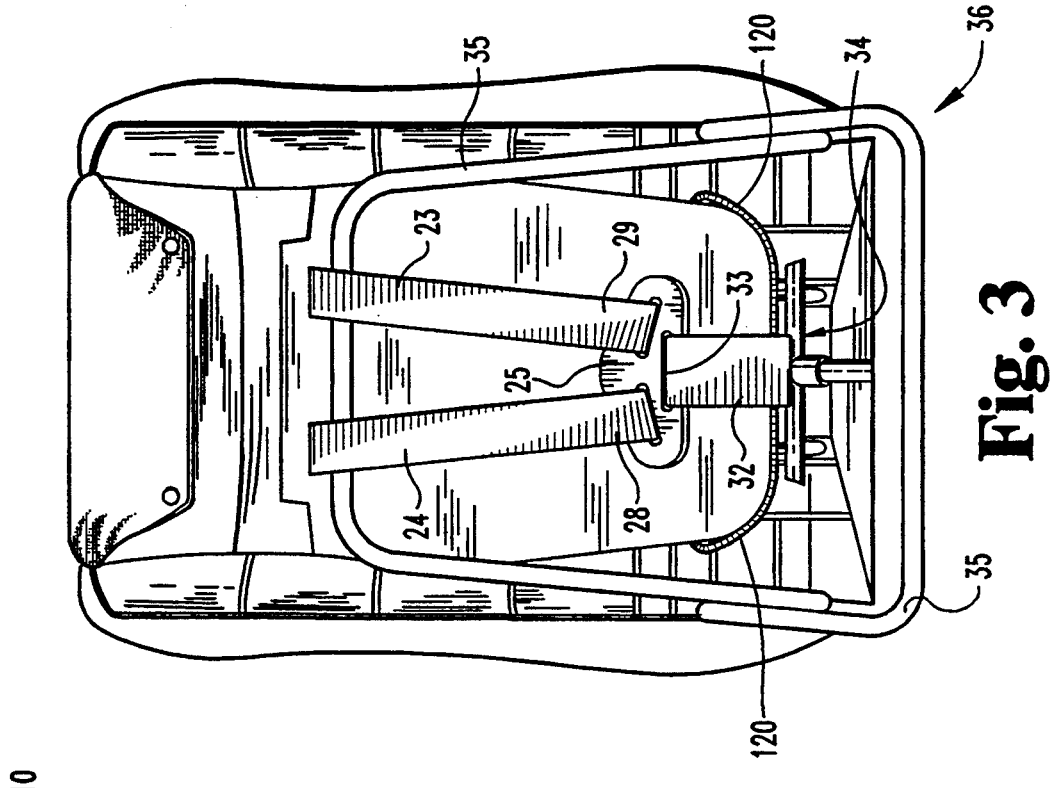
FIG. 3 is a rear view of the seat of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
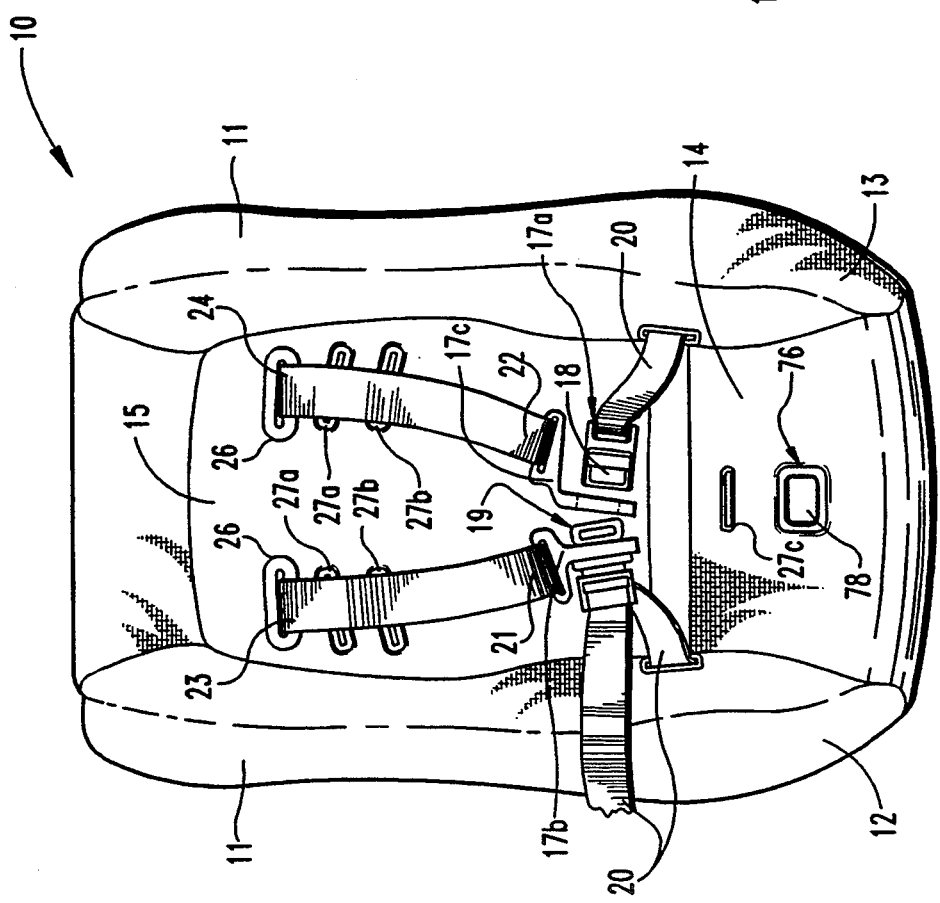
FIG. 1 is a front view of a child seat incorporating the alternate embodiment of the new and improved retractor disclosed herein.

Referring now to the drawings, in FIG. 1 there is shown a child seat 10, which includes an outer frame 11 having a pair of downwardly extending arms 12 and 13, with a cushioned seat area 14 and a cushioned back supporting area 15 located therebetween. A plurality of conventional tubing 35 forms a rear frame 36, which is adjustable to support the child seat 10 at a proper angle upon an automobile seat. Tubing 35 may be utilized to secure the child seat 10 to an automobile seat by any suitable means such as by extending the automobile seat belts securely around tubing 35. In the seat area 14 there is provided a seat belt buckle 17a of conventional construction. The push button 18 of buckle 17a faces outwardly allowing the child seat user to depress the same to release an elongated buckle tongue 19, which is shown released from the buckle 17a in FIG. 1. The buckle 17a is fixedly secured to belt 20, which extends through the downwardly extending arm 13 of seat 10, across the under side of seat 10 (FIGS. 2 and 3), and exits on the opposite side of the seat 10 through downwardly extending arm 12, where belt 20 is adjustably affixed to buckle tongue 19 by conventional means. Belt 20 functions as a lap belt.

The elongated tongue 19 also engages buckle members 17b and 17c by extending therethrough, before becoming lockingly engaged with buckle 17a. Buckle members 17b and 17c are removably secured to ends 21 and 22, respectively, of harness belts 23 and 24, each of which extend through the back supporting area 15 of seat 10 and then down the rear side of seat 10 (FIG. 3) to a belt connector or bar 25. Multiple pairs of through slots 26 and 27a and 27b are provided in back supporting area 15 of seat 10. Belts 21 and 22 are led either through the pair of slots 26 or through either of the pair of slots 27a or 27b, depending upon the size of the child to be placed in the seat 10. The belts 23 and 24 are extended through the upper pair of slots 26 if a large child is to be supported, or through either of the lower pair of slots 27a or 27b if a smaller child is to be supported.

The belt, buckle system and seat as described above are conventional and are currently available in the marketplace from a variety of sources. The present invention is the improved retractor to be disclosed herein.

Figure 6:
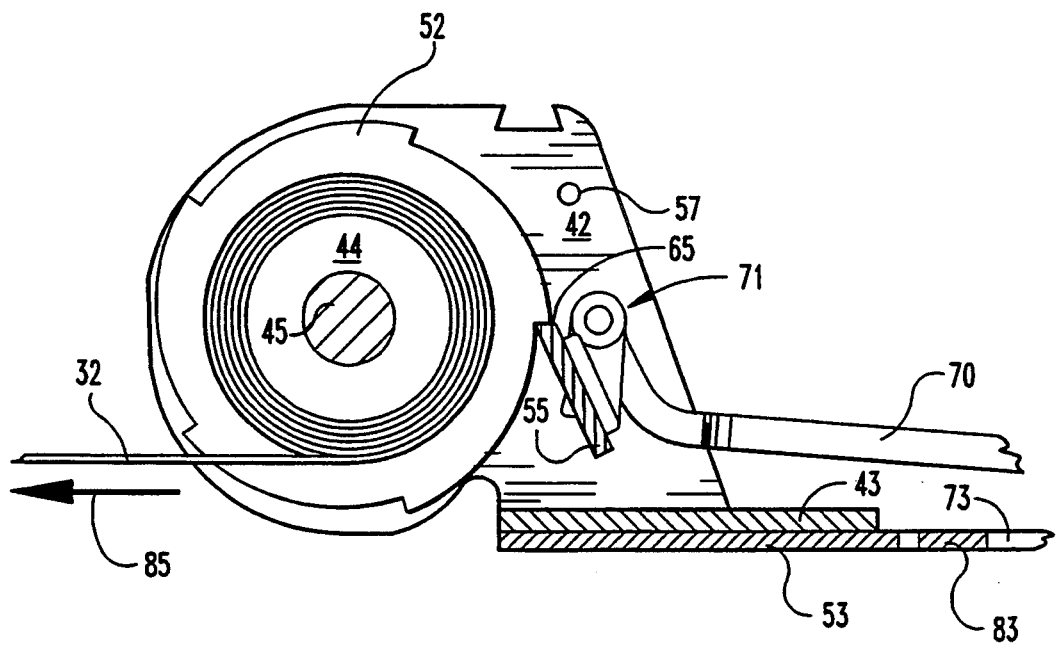
FIG. 6 is an enlarged fragmentary left side view of the retractor of FIG. 4 and showing the ratchet wheel and the spring biased locking bar in the normal locking position, limiting withdrawal of belt material from the retractor's spool.
Figure 7:
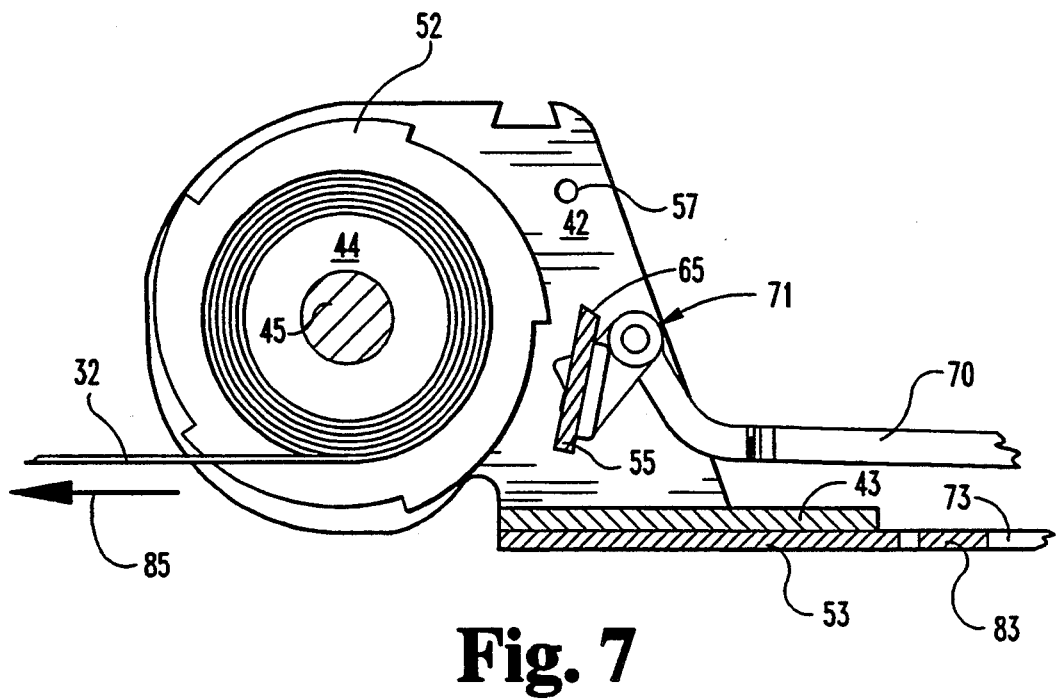
FIG. 7 is the same view of FIG. 4 only showing the spring biased locking bar in the removed position, freeing the retractor's spool to allow withdrawal of belt material.

Referring now to FIG. 3, a third belt 32 has a distal end 33 fixedly secured to belt connector 25, with the proximal end of belt 32 being wrappingly mounted on a spool 44 (FIGS. 6 and 7) of a belt retractor 34 of the present invention.

Figure 4:
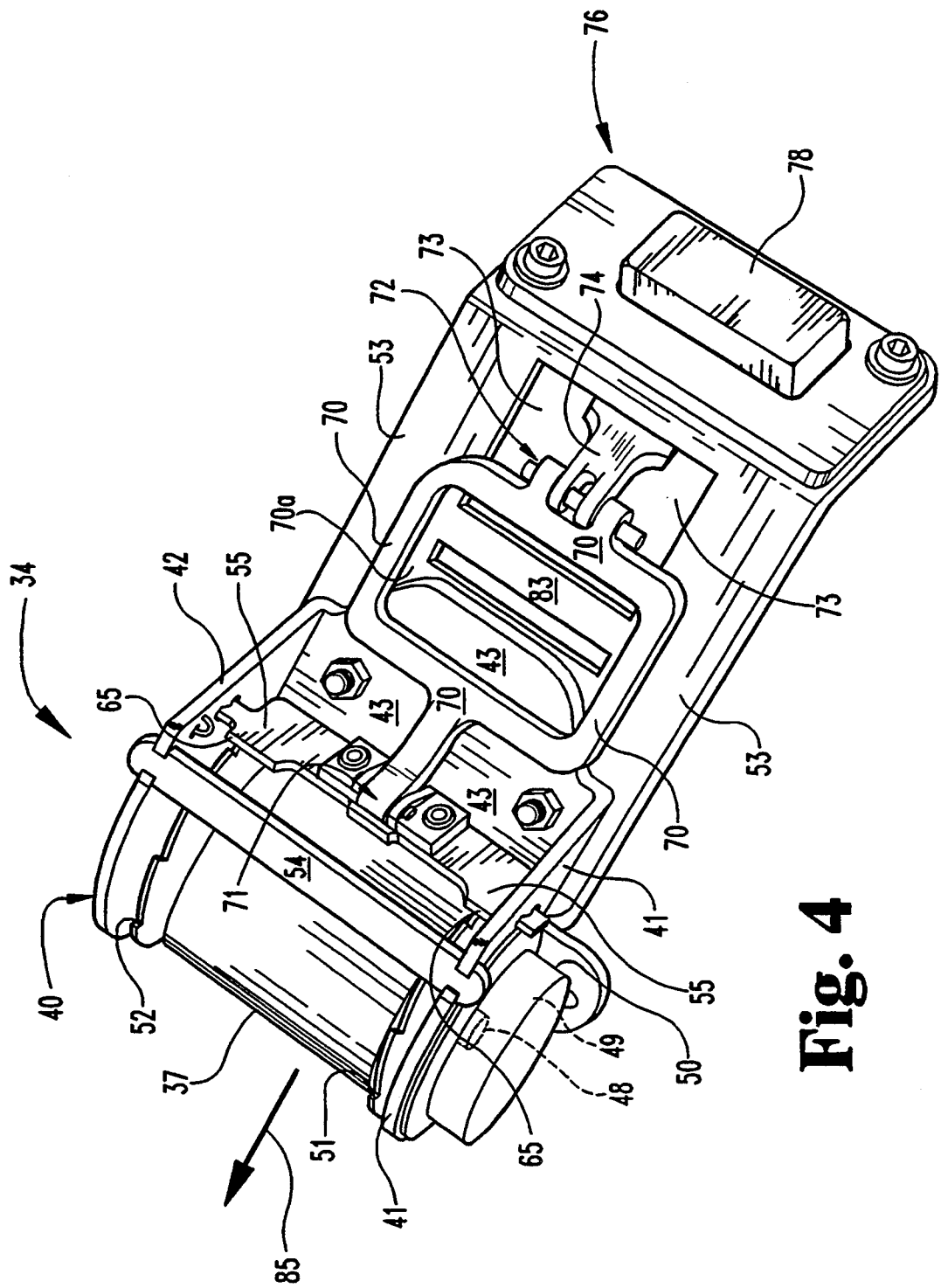
FIG. 4 is an enlarged perspective view of the alternate embodiment of the new improved retractor disclosed herein.
Figure 8:
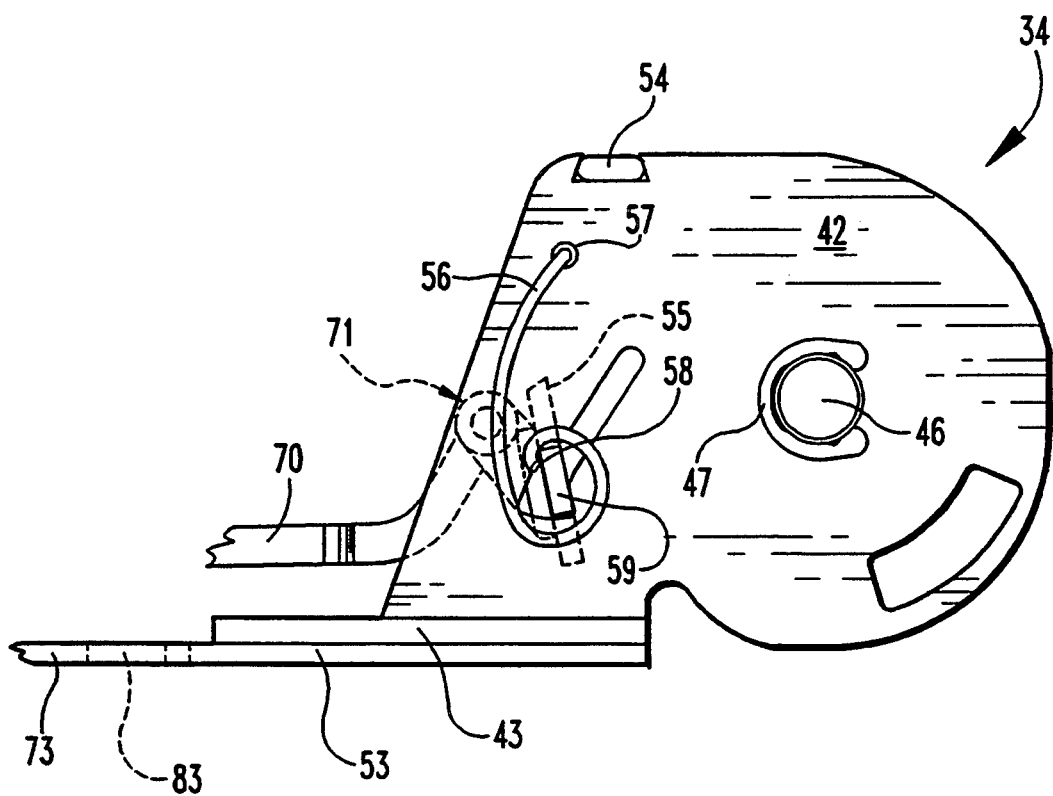
FIG. 8 is an enlarged fragmentary right side view of the retractor FIG. 4.

Referring now to FIG. 4, retractor 34 of the alternate embodiment includes a U-shaped frame 40 having a pair of spaced apart side walls 41 and 42 that are integrally joined together by a bottom wall 43. An additional cross member 54 (FIG. 4) extends between and secures the side walls 41 and 42 of the retractor frame together. A retractor spool 44 (FIGS. 6 and 7) is rotatably mounted to and between side walls 41 and 42, and includes an axle 45 extending through the side walls 41 and 42 with one outer end 46 (FIG. 8) secured to side wall 42 by means of a conventional spring biased C-clamp 47, extending into a circumferentially extending groove provided in end 46. The opposite end 48 of axle 45 extends through side wall 41 and is attached to a helical spring 49 provided within cover 50. The helical spring is operable to urge the axle to rotate and withdraw belt 32 onto spool 44 of the retractor 34, but is yieldable to allow for the withdrawal of the belt 32 from spool 44 in direction of arrow 85.

A pair of ratchet shaped end plates 51 and 52 are fixedly attached to axle 45 immediately inward of side walls 41 and 42, and plates 51 and 52 rotate with the axle 45 as belt 32 is pulled from or withdrawn onto the spool 44 of the retractor 34. A spring biased locking bar 55 has opposite ends which extend through side walls 41 and 42 and is pivotable from a locking position (FIG. 6) in which the locking bar 55 engages the ratchet shaped end plates 51 and 52 of the spool 44 thereby restricting the movement of the spool 44, to a removed position (FIG. 7) in which the locking bar is freed from its locking engagement with ratchet end plates 51 and 52, allowing spool 44 to rotate to permit belt 32 to be withdrawn from spool 44. A wire spring 56 (FIG. 8) has one end 57 attached to side wall 42 and an opposite end 58 attached to the outer end 59 of locking bar 55 with the wire spring 56 being operable to normally force locking bar 55 into the locking position and thus into engagement with the ratchet shaped end plates 51 and 52, such that end 65 of the locking bar 55 (FIGS. 6 and 7) may enter into contact with and block further withdrawal of belt 32 from the spool 44.

The retractor as described with a locking bar and ratchet shaped end plates associated with the retractor spool is conventional in nature, but notably absent is a cam plate or clutch plate to automatically control the disposition of the locking bar. The improvement of the present invention includes pivotally mounting an operator member 70 (FIG. 4) to the locking bar 55 that is manually and selectively operable by manual push button control means to move the locking bar 55 from its normal locking position (FIG. 6) against the bias of wire spring 56 to a removed position (FIG. 7) and to hold the locking bar 55 in the removed position until the belt and harness system of the child seat is adjusted. When the locking bar 55 is released by the push button control means locking bar 55 is forced to pivot to the locking position under the influence of wire spring 56 thereby allowing the locking bar to move into a locking position with respect to ratchet shaped end plates 51 and 52, preventing further withdrawal of belt 32 from the retractor spool 44.

Figure 2:
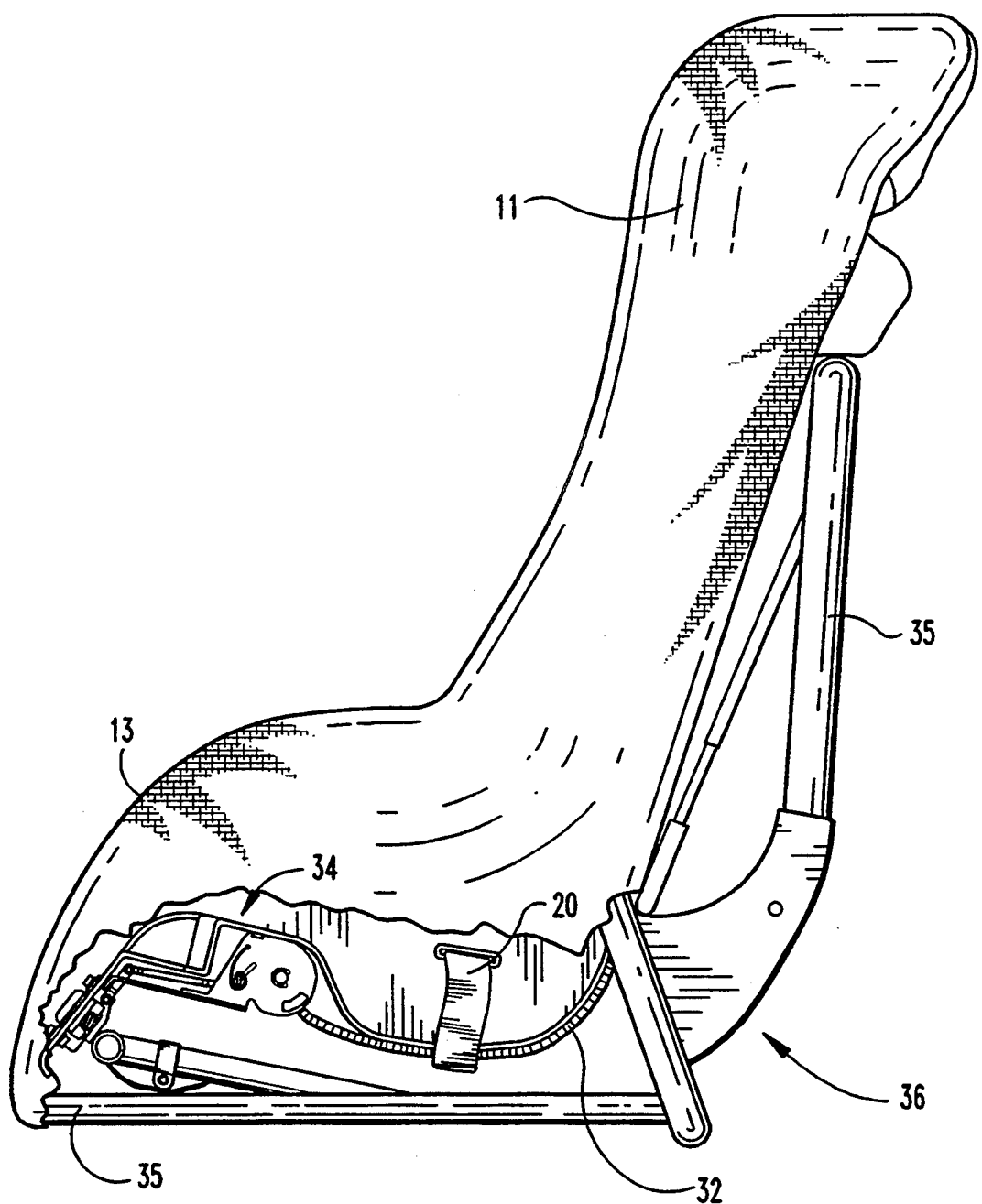
FIG. 2 is a fragmentary left side view of the seat of FIG. 1.
Figure 5:
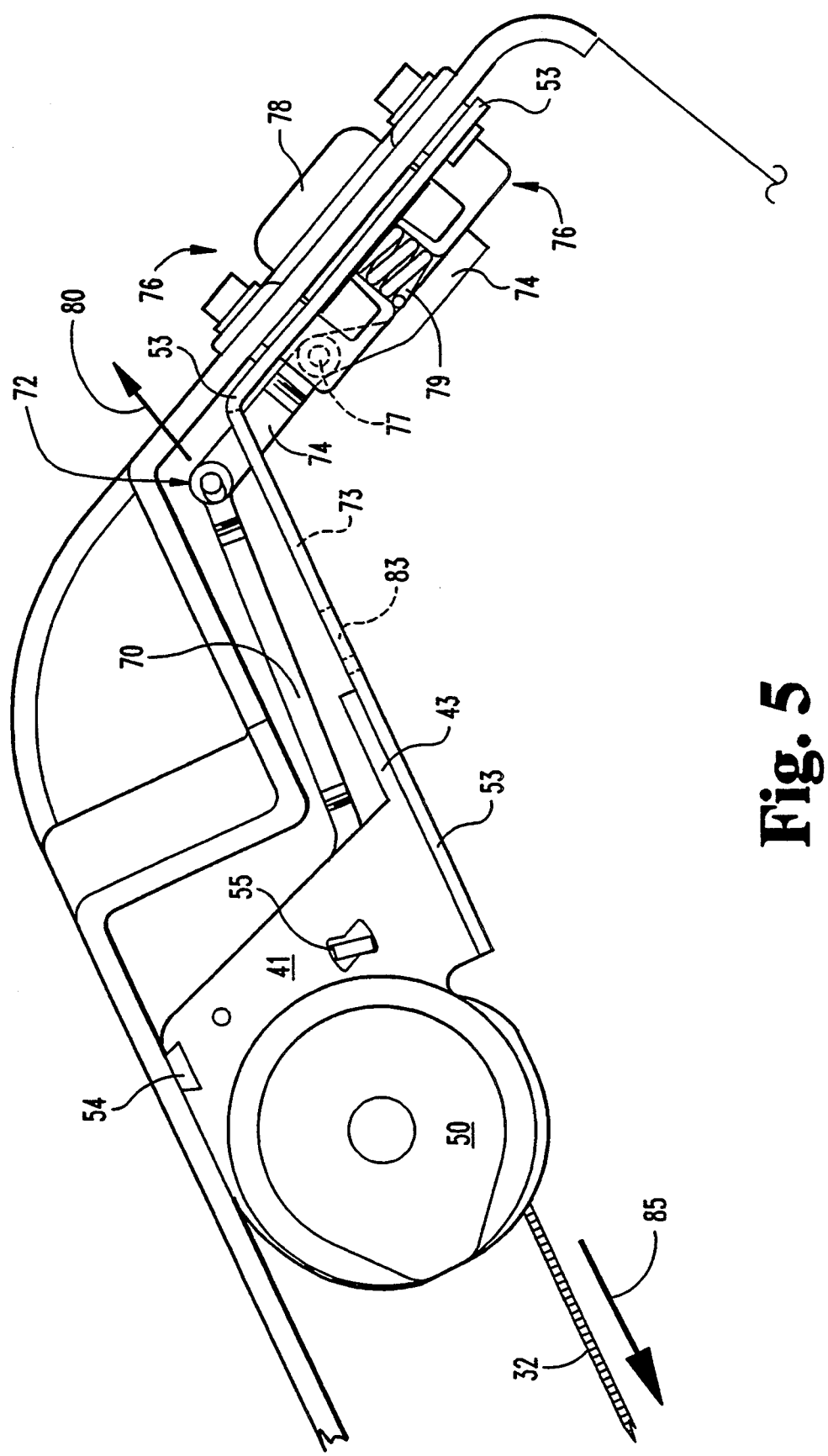
FIG. 5 is an enlarged left side view of the retractor of FIG. 4 shown mounted to the bottom of a child seat.

Referring now to FIG. 4, bottom wall 43 of retractor 34 is joined to an L-shaped base member 53 (FIG. 4) by which retractor 34 becomes secured to the frame 11 of the seat 10 of the preferred embodiment with the retractor 34 being positioned beneath or adjacent the under side of the seat 10 (FIGS. 2 and 5). Operator member 70 includes ends 71 and 72. End 71 is pivotally attached to locking bar 55. End 72 extends in the opposite direction to a point above an opening 73 provided through base member 53, where end 72 of operator 70 is pivotally connected to a button lever 74 (FIG. 5). Button lever 74 extends downwardly through opening 73, and is pivotally attached at a pivot point 77 to a push button housing 76, which houses a spring biased push button 78. Push button housing 76 is mounted through an opening in base member 53 located at the end thereof opposite retractor 34. A helical spring 79 biases push button 78 in an up position. When push button 78 is manually depressed, as shown in FIG. 5, button 78 contacts button lever on its end opposite its connection with end 72 of operator 70 causing button lever 74 to pivot about pivot point 77, and causing end 72 of base member 53 to move generally in the direction of arrow 80. This movement of end 72 of base member 53, in turn, moves end 71 of operator member 70, which pivots locking bar 55 against the spring bias of wire spring 56 and from the locking bar's locking engagement with ratchet shaped end plates 51 and 52 (FIG. 6), which is the locking position, to the removed position (FIG. 7), which allows free withdrawal of belt 32 from spool 44. When push button 78 is manually released, it is biased to an up position by helical spring 79, and the locking bar 55 is pivoted to the locking position (FIG. 6) under the spring bias of wire spring 56 with operator 70 and button lever 74 following suit.

Referring to FIGS. 1 and 2, L-shaped base member 53 allows push button housing 76 and push button 78 to be situated forward in the seat area 14 of child seat 10 of the preferred embodiment where it extends through the seat area 14 through a suitable sized opening so as to be readily accessible to the user.

In an alternative embodiment of seat 10, a fifth belt (not shown) may be added by anchoring one end to cross member 53 of base member at tab 83 (FIG. 4), and by leading the other end, fitted with a buckle member complementary with buckle members 17b and 17c and to be similarly received by tongue 19 through a suitable opening 70a provided in operator 70, and then up through slot 27c in seat area 14.

The retractor 34 disclosed herein includes a spring biased spool 44 which wrappingly receives belt 32 and normally urges the belt 32 to a retracted condition, but which is yieldable to allow withdrawal 32. The locking bar 55 of retractor 34 is normally engaged with the ratchet shaped end plates 51 and 52 of the retractor to limit rotation of the spool 44 and withdrawal of the belt 34. When push button 78 is depressed, locking bar 55 is manually pivoted to a removed position in which spool 44 is freed from its locking engagement with locking bar 55, and belt 32 may be freely withdrawn from spool 44. Thus, the user may push button 78 and freely adjust the belt system connected to belt 32 until such time as the proper adjustments have been made, and then simply release button 78 to lock the retractor.

Figure 10:
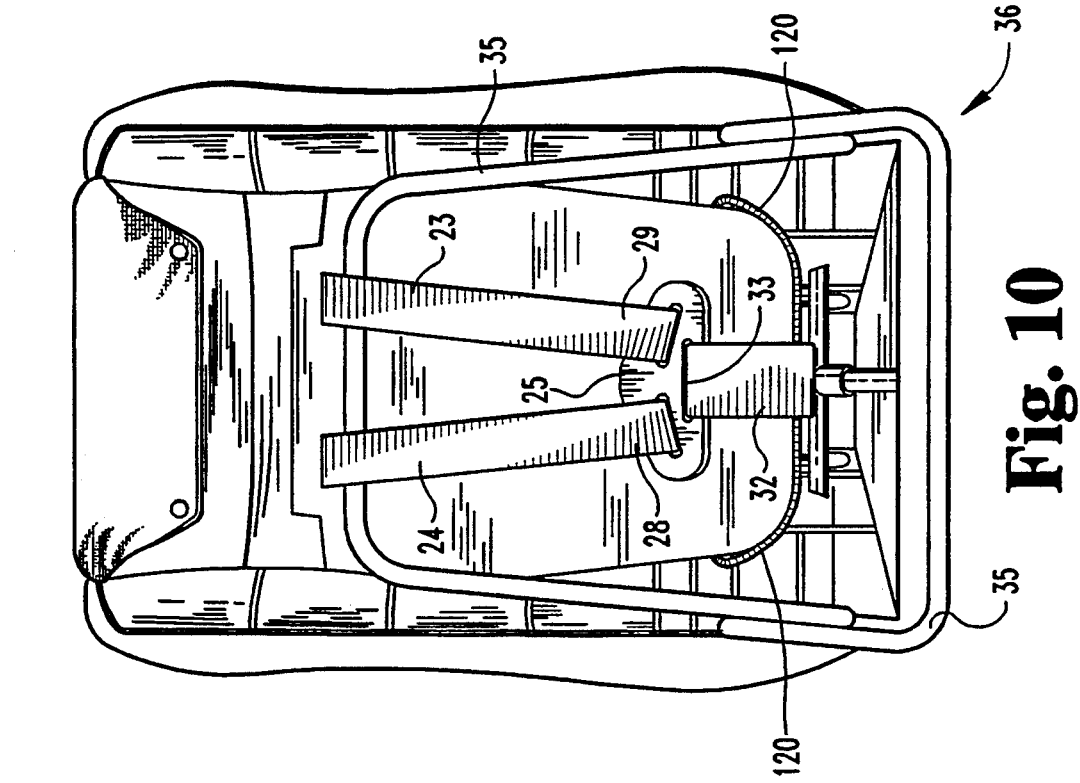
FIG. 10 is rear view of the seat of FIG. 9.
Figure 9:
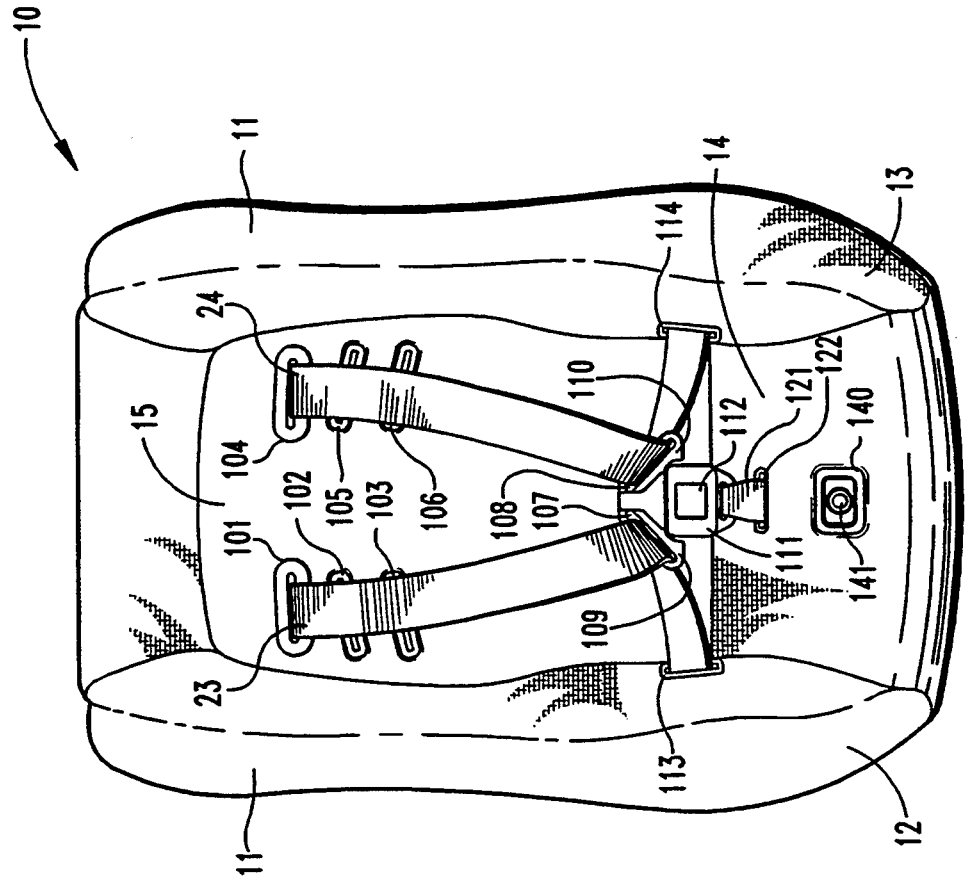
FIG. 9 is a front view of a child seat incorporating the preferred embodiment of the new and improved retractor disclosed herein.
Figure 11:
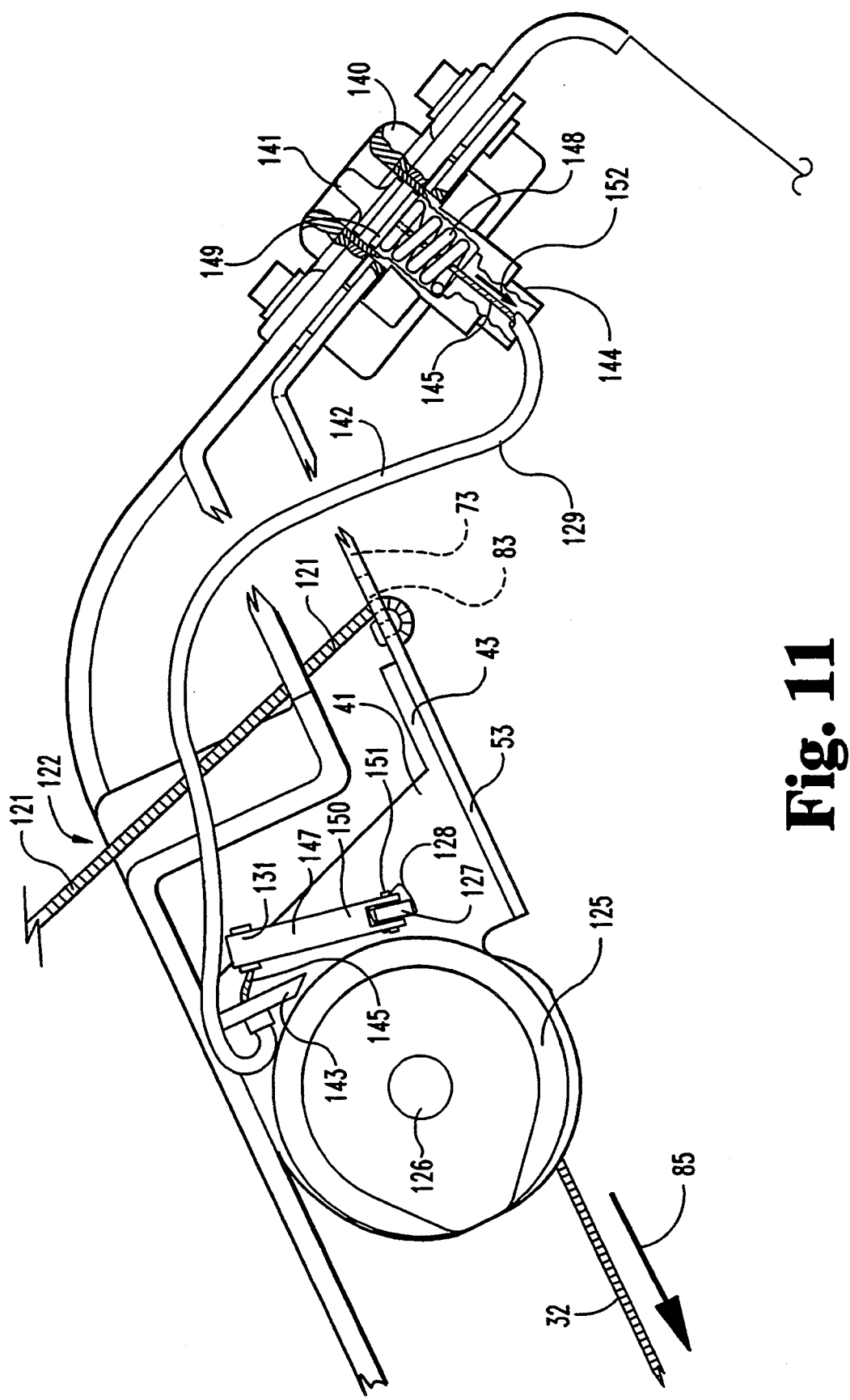
FIG. 11 is a fragmentary enlarged left side view of the preferred embodiment of retractor mounted to the bottom of the child seat of FIG. 9.

The preferred embodiment of the belt retractor with push button controlled locking bar is shown in FIGS. 9-11. Seat 10 is identical to the seat previously described and thus has an outer frame 11 with a pair of downwardly extending arms 12 and 13, with a cushion seat area 14 and cushion back supporting area 15 located therebetween. The cushion back supporting area 15 includes a first set of slots 101–103 and a second set of slots 104–106. Belts 23 and 24 have first ends 29 and 28 (FIG. 10) secured to a conventional T-bar or belt connector 25 with the belts then extending each through a slot formed in back supporting area 15. In the embodiment shown in FIG. 9, belts 23 and 24 extend slidably through slots 101 and 104 which are arranged to accommodate a large size child as compared to accommodating a small size child when the belts extend through slots 103 and 106.

Belts 23 and 24 extend slidably respectively through slots 107 and 108 of tongues 109 and 110, in turn, having tongue blades releaseably lockable with buckle 111. Tongues 109 and 110 are identical to the buckle tongues disclosed in the commonly owned U.S. Pat. No. 5,023,981. Likewise, buckle 11 is identical to the buckle disclosed in the commonly owned U.S. Pat. No. 5,023,981 which is herewith incorporated by reference. Buckle 11 is provided with a push button 112 to allow the user to unlock the buckle relative to tongues 109 and 110. Once belts 23 and 24 extend through slots 107 and 108, the belts then diverge and extend through a pair of apertures 113 and 114 formed in the sides of arms 12 and 13. Belts 23 and 24 are integrally joined together by intermediate portion 120 (FIG. 10) which extends across the bottom of the seat. Thus, belts 23 and 24 are joined together in a single belt configuration extending across the bottom of the seat and then through slots 113 and 114, passing through slots 107 and 108 of tongues 109 and 110 and then through the pair of slots 101 and 104 ultimately being connected to belt connector 25. Belts 23 and 24 are joined to belt connector 25 in such a fashion to allow the belts to be removed from the belt connector in the event the belts are to be changed and extended through either slots 102 and 105 or slots 103 and 106.

Buckle 111 is attached to web 121 extending through slot 122 formed in the cushion seat area 14. The opposite end of belt 121 is fixedly attached to tab 83 (FIG. 11) of cross member 53 fixedly attached to the seat frame 35.

Belt 32 (FIG. 10) has a distal end 33 fixedly secured to belt connector 25 with the proximal end of belt 32 wrappingly mounted on a spool of a retractor as previously described and shown in FIG. 4. Retractor 125 (FIG. 11) is mounted to and beneath the seat shown in FIG. 9 and is identical to retractor 34 previously described with the exception that retractor 125 does not include the wire spring 56 (FIG. 8) nor the linkage 70. Instead linkage 70 has been replaced by a cable 129 (FIG. 11) which extends from button 140 to lever 131.

Retractor 125 is conventional in nature in that it has a retractor spool having an axle 126 rotatably mounted to and between a pair of sidewalls in a manner identical to that described for retractor 34. One end of axle 126 is secured to the retractor frame sidewall by means of a C-shaped clamp whereas the opposite end of the axle extends through the remaining retractor frame sidewall and is connected to a coiled spring to urge retraction of belt 32 which is wound on the retractor spool. The spring engaging axle 126 is yieldable to allow extension of web 32 in the direction of arrow 85 with the opposite end 33 (FIG. 10) of web 32 being fixedly attached to belt connector 25.

The spool of retractor 125 includes a pair of ratchet shaped end plates 51 and 52 (FIG. 4) with web 32 extending therebetween. Likewise, retractor 125 includes a locking bar 127 identical to locking bar 55 which is parallel to the spool axle. Bar 127 engages the ratchet shaped end plates of the spool thereby restricting the movement of the spool and preventing web movement. The opposite ends of locking bar 127 are received in a pair of apertures formed in the retractor sidewalls to allow the locking bar to pivot to and from the ratchet shaped flanges of the spool. For example, ratchet sidewall 41 is provided with aperture 128 through which locking bar 127 projects. Thus, retractor 125 operates in an identical manner to retractor 34 except that movement of locking bar 127 is controlled by cable 129 and does not include the operator member 70 and spring 56.

Cable 129 includes an outer housing 142 extending between and attached to wall 143 of cross member 53 and to button housing 144 also mounted to cross member 53. Wire 145 extends through and is slidable within housing 142 with one end 146 of wire 145 fixedly attached to the top end 147 of lever 131 with the opposite end of the wire extending through spring 148 and attached to plate 149. Plate 149 is spaced apart from the interior end of button 141 of the push button operator 140 mounted to the forward portion of the cushioned seat area 14. Helical spring 148 is contained within housing 144 and is operable to normally urge plate 149 and wire 145 toward button 141.

One end 150 of lever 131 is bifurcated and extends along the opposite sides of locking bar 127. Pen 151 extends through the bifurcated end of lever 150 and the upper portion of locking bar 127. Thus, by depressing button 141, the button is caused to contact and move plate 149 and wire 145 in the direction of arrow 152 thereby moving lever 131 and locking bar 127 in a clockwise direction as viewed in FIG. 11 causing the locking bar to move apart from the ratchet shaped flanges of the web spool allowing the spool to freely rotate and to retract web 32 under the pressure of the spring force applied to the spool axle or to allow the web to be withdrawn in the direction of arrow 85 in the event withdrawal pressure is greater than the spring retraction pressure. By continuing to depress button 141, web 32 along with belts 23 and 24 may be adjusted to extend over the occupant of the child seat. By removing finger pressure from button 141, helical spring 148 is operable to move plate 149 and wire 145 in a direction opposite of arrow 152 thereby pivoting lever 131 and locking bar 127 in a counterclockwise direction, as viewed in FIG. 11, thereby causing the locking bar to lockingly engage the ratchet shaped flanges of the web spool preventing further withdrawal or extension of web 32 relative to the retractor until button 141 is again depressed. Housing 144 is fragmented to illustrate the construction of the spring 148, plate 149 and wire 145. Likewise, it is to be understood cable 142 extends through the various frame members as the cable extends from the push button towards the retractor.

Many variations are contemplated and included in the present invention of FIG. 11. For example, wire 145 is shown as connected to lever 131, in turn, mounted to one end of locking bar 127. An alternate means of connection is to connect cable 145 to an extension, in turn, mounted to the locking bar equi-distant between the ends of the locking bar. Likewise, in lieu of locating a spring at the end of the wire adjacent button 141, the same result may be obtained by locating a spring near the opposite end of the wire adjacent locking bar 127, it being understood that the desired objective is to apply spring pressure to the wire to normally cause the locking bar to lockingly engage the spool ratchet flanges when finger pressure is not applied to button 141. Further, in lieu of utilizing a button 141, the same result may be obtained by replacing the button by a lever pivotally mounted to engage plate 149 in an identical manner.

In certain cases, the child seat will be originally installed with the vehicle main seat and will not be an added feature. In such a case, retractor 125 is not mounted to the child seat frame but instead is mounted to the vehicle main frame or the vehicle main seat frame.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A retractor for use with a child seat having a harness, an interengaged combination of a tongue and seat belt buckle comprising:
   a frame;
   a spool to wrappingly receive a portion of said harness and having an axle and end walls at least one of which is configured as a ratchet wheel with said spool rotatably mounted to said frame;
   a spring mounted to said frame and normally urging said spool to rotate to a retracted position whereat a portion of said harness is wrapped thereon;
   a locking bar parallel to said axle and mounted to said frame to be movable between a removed position whereat said locking bar is located apart from said ratchet wheel and a normal locking position whereat said locking bar lockingly engages said ratchet wheel limiting movement of said spool;
   cable means mounted to said locking bar and movable from a first position whereat said locking bar is in said locking position to a second position whereat said cable means moves said locking bar to said removed position; and,
   operator control means mounted to said child seat and connected to an end of said cable means opposite said locking bar and including a member that is manually operable independent of operation of said interengaged combination of said tongue and seat belt buckle for holding said cable means in said second position when manually moved and for moving the cable means to said first position when said member is manually released, said spool free to rotate to extend or retract said harness at all times whenever said locking bar is moved to said removed position by said cable means.

2. A retractor for use with a child seat having a harness, an interengaged combination tongue and seat belt buckle comprising:
   a frame;
   a spool to wrappingly receive a portion of the harness and having an axle and end walls at least one of which is configured as a ratchet wheel with said spool rotatably mounted to said frame;
   a first spring mounted to said frame and normally urging said spool to rotate to a retracted position whereat a portion of said harness is wrapped thereon;
   a locking bar parallel to said axle and mounted to said frame to be movable between a removed position whereat said locking bar is unlocked from said ratchet wheel and a locking position whereat said locking bar lockingly engages said ratchet wheel limiting movement of said spool; and
   operator means including manual push button means mounted to said locking bar and movable independent of operation of said interengaged combination of said tongue and seat belt buckle from a first position whereat said locking bar is in said locking position, to a second position where said operator means moves said locking bar to said removed position and holds said locking bar in said removed position until said push button means is manually released, said operator means including additional means extending between said locking bar and said manual push button means to transfer motion of said manual push button means to said locking bar, said spool enabling said harness to rotate to extend or retract at all times whenever said locking bar is moved to said removed position by said operator means.

3. A retractor for use with a child seat having a harness, an interengaged combination tongue and seat belt buckle comprising:
   a frame;
   a spool to wrappingly receive a portion of the harness and having an axle and end walls at least one of which is configured as a ratchet wheel with said spool rotatably mounted to said frame;
   a first spring mounted to said frame and normally urging said spool to rotate to a retracted position whereat a portion of said harness is wrapped thereon;
   a locking bar parallel to said axle and mounted to said frame to be movable between a removed position whereat said locking bar is unlocked from said ratchet wheel and a locking position whereat said locking bar lockingly engages said ratchet wheel limiting movement of said spool; and
   operator means including manual push button means mounted to said locking bar and movable independent of operation of said interengaged combination of said tongue and seat belt buckle from a first position whereat said locking bar is in said locking position, to a second position where said operator means moves said locking bar to said removed position and holds said locking bar in said removed position until said push button means is manually released; and wherein;
   said operator means includes a cable extending between and connected to said push button means and said locking bar, said cable moves said locking bar to said removed position when said push button means moves to said second position.

4. The retractor of claim 3 wherein:
   said cable means includes a second spring operable to urge said locking bar to said locking position when said push button means is in said first position but yieldable to allow said locking bar to move to said removed position when said push button means moves to said second position.

5. The retractor of claim 4 wherein:
   said cable means includes a wire with a first end connected to said locking bar and a second end adjacent said second spring, said second spring operable to urge said second end toward said push button means but yieldable when said push button means is depressed to engage said second end and second spring moving said wire with said locking bar to said removed position.

6. A child seat harness for installation in an automobile comprising:
a child seat configured to receive a child;
a harness mounted to said child seat and extendable over the child to secure the child within said child seat;
an interlocking tongue and seat belt buckle mounted to said child seat and interlockable with said harness; and,
automatic retractor means including a frame, a spool to wrappingly receive a portion of said harness and having an axle and end walls at least one of which is configured as a ratchet wheel with said spool rotatably mounted to said frame, a first spring mounted to said frame and normally urging said spool to rotate to a retracted position whereat said harness is wrapped thereon, a locking bar mounted to said frame and movable between a removed position whereat said locking bar is unlocked from said ratchet wheel and a locking position whereat said locking bar lockingly engages said ratchet wheel limiting movement of said spool; and
operator means including manual means mounted to said child seat and connected to said locking bar and movable independent of operation of said interlocking tongue and seat belt buckle from a first position whereat said locking bar is in said locking position, to a second position whereat said operator means moves said locking bar to and holds said locking bar in said removed position until manually released, said operator means including a cable extending between said locking bar and said manual means to transfer motion of said manual means to said locking bar, said spool free to rotate to extend or retract said harness at all times whenever said locking bar is moved to said removed position by said cable.

7. The retractor of claim 6 wherein:
said operator means includes a second spring operable to urge said locking bar to said locking position when said manual means is in said first position but yieldable to allow said locking bar to move to said removed position when said manual means moves to said second position.

8. The retractor of claim 7 wherein:
said cable includes a wire with a first end connected to said locking bar and a second end adjacent said second spring, said second spring operable to urge said second end toward said manual means but yieldable when said manual means is depressed to engage said second end and second spring moving said wire with said locking bar to said removed position.

* * * * *